Aug. 29, 1961 C. F. GOSS 2,997,976
TIRE DEFLATION INDICATOR
Filed June 22, 1959 2 Sheets-Sheet 1
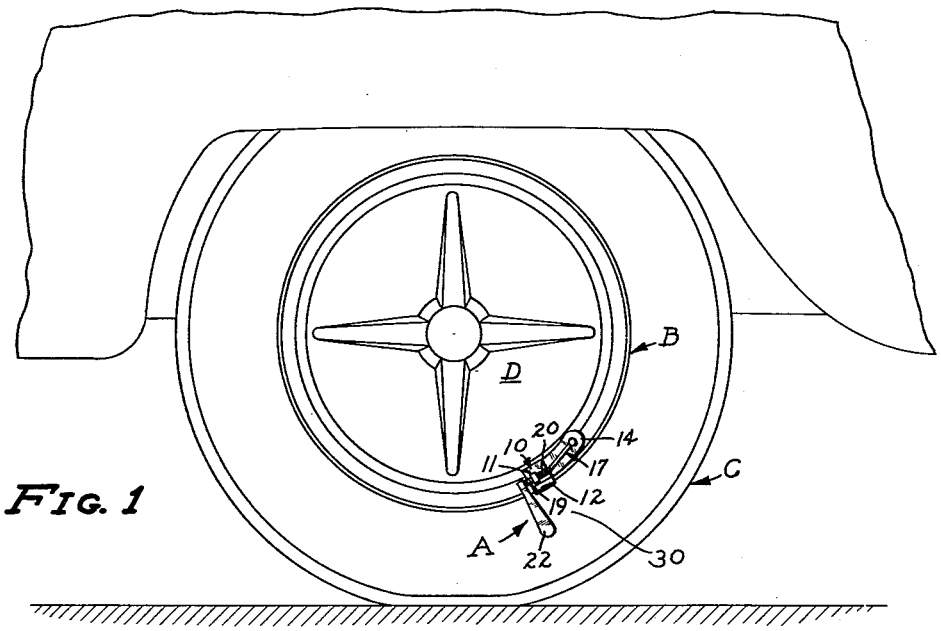
Fig. 1
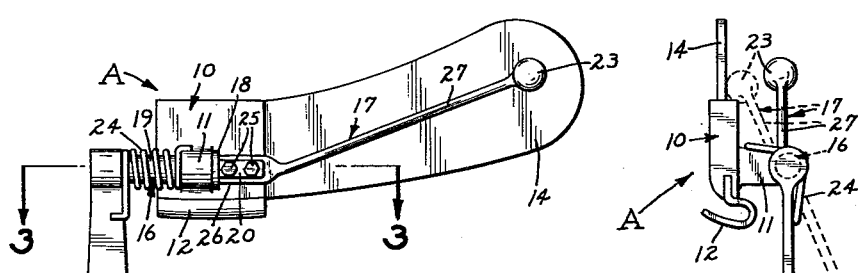
Fig. 2
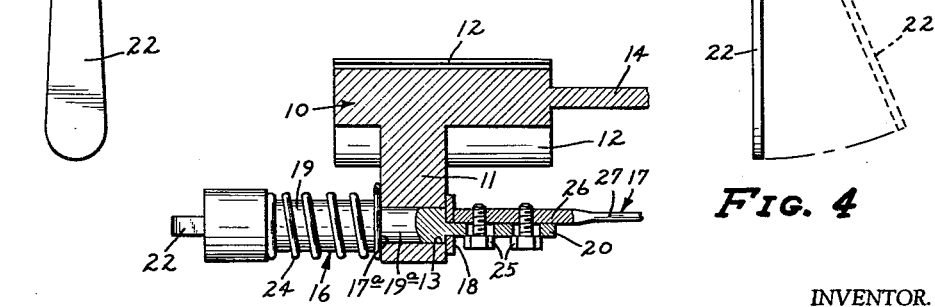
Fig. 3
Fig. 4
INVENTOR.
CLAUDE F. GOSS
BY
Merchant v Merchant
ATTORNEYS

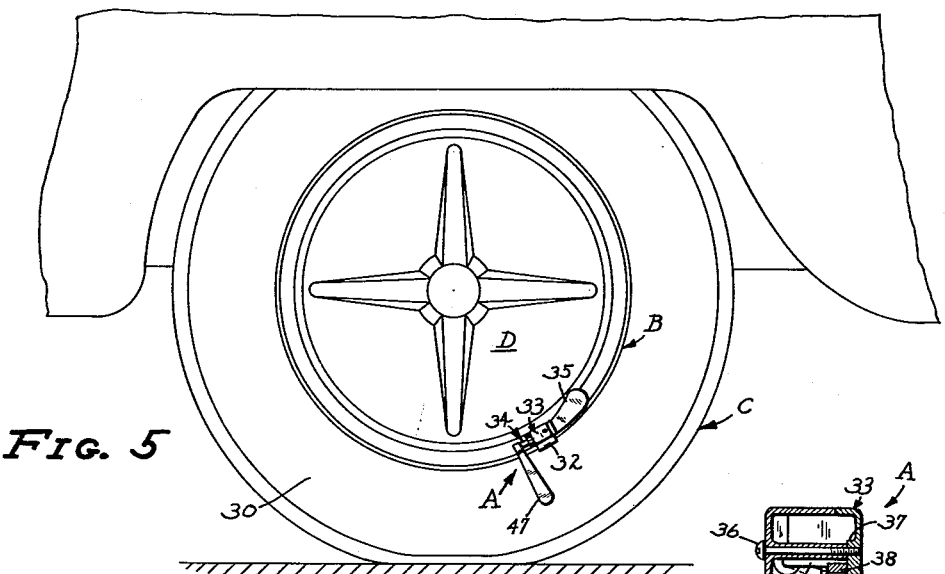
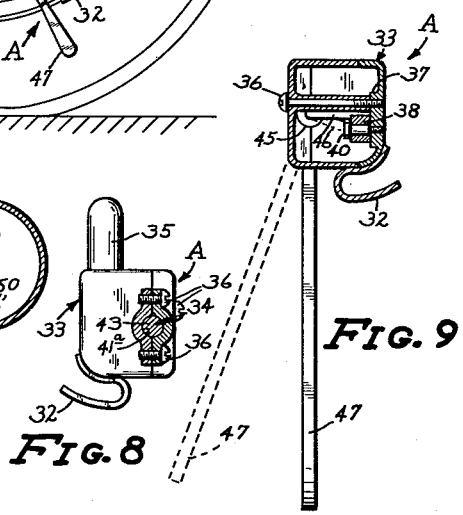
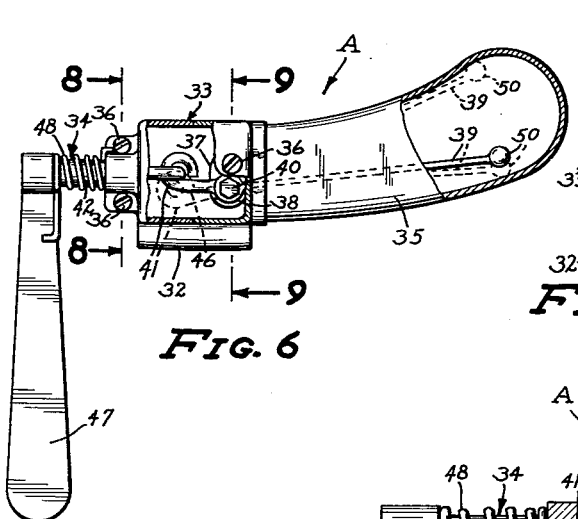
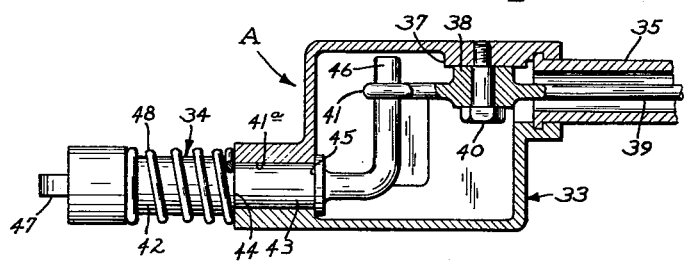
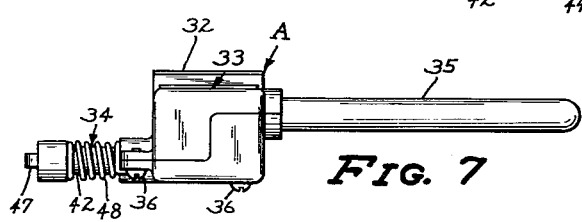

United States Patent Office 2,997,976
Patented Aug. 29, 1961

2,997,976
TIRE DEFLATION INDICATOR
Claude F. Goss, 607 3rd St. N., New Ulm, Minn.
Filed June 22, 1959, Ser. No. 822,056
1 Claim. (Cl. 116—34)

This invention relates to a new and improved motor vehicle accessory; in particular it concerns a novel warning device adapted to produce an audible signal whenever the pressure in a pneumatic tire drops below the proper level.

The evils of low tire pressure have been recognized by most motorists as well as members of the autombile industry for a number of years. According to a recent study, tire pressure five pounds lower than normal shortens tire life by 32 percent; nine pounds of under-inflation cuts tire life by 52 percent. Thus, it can be seen that maintaining the correct tire pressure is a most important factor in safe and economical driving. Reliance upon service station attendants certainly is not the answer to the problem, nor can one easily form the tedious habit of checking the tires every time the vehicle is used.

Pressure sensitive devices attached to the valve stems afford a partial solution. However, their intricate design and complexity of action militates against their use for all practical applications. Moreover such stratagems do not take into account the fact that pressure per se in the tire is not the touchstone to tire wear and breakdown. Rather, it is the shape of the cross section of the tire that governs the type and amount of wear that will be produced under given conditions. An under-inflated tire will have a pronounced deformation in its side wall due to the inability of the wall material to withstand the vehicle load. Indeed, it is far better to have the tires three or four pounds harder than normal as the cross section will not be deformed.

Thus, a desideratum of a tire deflation indicator is the ability to detect and transmit a warning of a bulge or side wall deformation resulting from the under inflation of a tire. To eliminate troublesome maintenance problems the device should be characterized by simple mechanical features entirely self contained within the tire area. It should be easy to install and remove. Positive action is, of course, a necessary attribute to insure safety and reliability. The warning signal should be readily comprehended.

Accordingly, it is a broad object of this invention to provide an improved tire deflation indicator.

Another object of this invention is to provide audible means for detecting changes in a tire due to under-inflation.

Still another object of this invention is to provide a tire deflation indicator characterized by simple construction and adapted to be easily installed and removed.

A further object of this invention is to provide a tire deflation indicator responsive to changes in the side wall of a tire and independent of the valve mechanism of the tire.

Another object of this invention is to provide in a tire deflation indicator novel means for producing an audible signal whenever the tire is under-inflated.

Another object of this invention is to provide a tire deflation indicator having positive action and reliability.

Yet another object of this invention is to provide a compact light weight tire inflation indicator adapted for use with a minimum of compensation for tire unbalance.

These and other objects and advantages will become apparent from a consideration of the following detailed description taken in conjunction with the accompanying drawings wherein is shown two embodiments of the invention by way of illustration only.

Referring to the drawings wherein like characters indicate like parts throughout the several views:

FIG. 1 is a partial elevational view showing one form of the invention installed on the wheel of an automobile;

FIG. 2 is a side view of one form of the invention;

FIG. 3 is a fragmentary view partially in section taken along the line 3—3 of FIG. 2;

FIG. 4 is an end view of one form of the invention;

FIG. 5 is a partial elevational view showing a second form of the invention installed on the wheel of an automobile;

FIG. 6 is a side view, partially in section, of the second form of the invention;

FIG. 7 is a top view of the second form of the invention;

FIG. 8 is a view, partially in section, taken along the line 8—8 of FIG. 6;

FIG. 9 is a view, partially in section, taken along the line 9—9 of FIG. 6; and

FIG. 10 is an enlarged fragmentary horizontal sectional view of the second form of the invention, some parts being broken away.

Referring to the drawings, FIGS. 1 and 5 illustrate a conventional tire and wheel assembly designated by the reference characters C and D respectively. The device A is mounted on rim flange B of wheel D, a portion thereof being in contact with side wall 30 of tire C.

FIGS. 2 to 4 contain detailed views of the structural characteristics of one form of the invention A, while FIGS. 5 to 10 illustrate a second form thereof. In the embodiment of FIGS. 2 to 4, a rigid plate-like bracket 10 is provided securable to rim flange B by means of anchor 12. Anchor 12 has a hook shaped body and is of the type used in mounting wheel weights for balancing and the like. Integral with bracket 10 and disposed perpendicular thereto is extension 11 having hole 13 therein, the axis of which is generally parallel to rim flange B. Hole 13 of extension 11 provides a bearing for shaft 16, of stepped construction and having a relatively long longitudinal section 19 of greater diameter than hole 13 and a short journal section 19a adapted to rotate in the bearing surface formed by hole 13. Section 19a of shaft 16 terminates in rectangular section 20, which has a machined undersurface adapted to engage a complementary surface integral with finger 17, as will be explained.

Shaft 16 is restrained from longitudinal movement by shoulder 17a in abutting engagement with extension 11 and spring washer 18 (shown in FIGS. 2 and 3) positioned on the opposite side of extension 11. Actuator arm 22, mounted in longitudinal spaced relation to shoulder 17a on shaft 16, rotates therewith and is spring biased toward engagement with the side wall 30 of tire C by means of coil spring 24. Arm 22 is of sufficient length to contact the medial portion of wall 30 of tire C and is preferably greater in width at the free end thereof to facilitate more efficient contact and provide dynamic balance.

Attached to bracket 10 and extending laterally therefrom is sounding baffle 14. Baffle 14 may be fabricated integrally with bracket 10 or it may be secured thereto by well known means. As indicated in FIG. 2, baffle 14 comprises a thin flat plate having curved edges and is adapted to reside normally adjacent the inner edge of rim flange B. Spring finger 17, consisting of a thin elongated central portion 27 terminating at the inner end thereof in rectangular section 26 and at the outer end thereof in spherical weight 23, is secured to shaft 16 by means of screws 25 threaded into rectangular section 26 machined to engage section 20 of shaft 16.

The invention is clamped to rim flange B by means of anchor 12 and allowed to reside in the position shown in FIG. 1. Under normal conditions spring 24 urges actuator arm 22 in a substantially vertical position thus maintaining weight 23 in spaced relation to sounding baffle 14. This position is illustrated by the solid lines in FIG. 4. Upon deflation of the tire, side wall 30 is forced to assume a deformed cross section beneath the axle. The resulting bulge forces arm 22 to rotate vertically about the axis of shaft 16 to the position indicated by the dotted lines in FIG. 4. Weight 23, being freely movable with arm 22 is swung into contact with baffle 14 thereby producing an audible signal for the operator of the vehicle.

It is known that even normal road speeds create relatively high rotative speeds for the wheels of a vehicle; it can be seen that the resulting clapping effect caused by the periodic engagement of weight 23 with baffle 10 provides a positive and unmistakable notice to the operator that a tire is under-inflated.

The second form of the invention A is attached to wheel D, as shown in FIG. 5, in a manner similar to the mounting illustrated in FIG. 1. In this form, a hook 32 is secured as by welding or with silver solder, to a box shaped hollow housing 33 adapted to receive at one end thereof a rotatable shaft element 34 and at the opposite end thereof a relatively thin elongated curved hollow casing 35.

For the sake of convenience, housing 33 may be fabricated in two sections that are held together by machine screws 36. An internal boss 37 is provided with housing 33 against which mating section 38 of spring finger 39 resides, held in intimate rotatable contact therewith by machine screw 40, as disclosed in FIG. 10. An eye forming extension 41 of finger 39 is cantilevered on the opposite side of screw 40 to provide for the rotation of finger 39 about screw 40. Shaft 34 is journaled within housing 33 by virtue of a bearing surface 41a formed in housing 33 at the end opposite from casing 35. The external portion 42 of shaft 34 is of larger diameter than the internal journal portion 43; and the shoulder 44 formed by the juncture of portions 42 and 43, in connection with an integral internal shoulder 45 which is in abutting engagement with the internal wall of housing 33 prevents longitudinal displacement of the shaft assembly. Within housing 33 shaft 36 terminates in an arm 46 bent at right angles to its longitudinal axis, coplanar therewith and positioned so the free end of arm 46 passes through the eye of extension 41.

Attached to the outer end of shaft 34 is a depending actuator arm 47 that rotates with shaft 34 and is spring biased toward engagement with the side wall 30 of tire C by means of coil spring 48. The length of actuator arm 47 corresponds to the length of the arm 22 used in the other form of the invention, i.e., it is of sufficient length to contact the medial surface of wall 30 of tire C.

Spring finger 39 has an enlarged portion 50 at the free end thereof which may be spherical in shape. The entire sounding mechanism is thus self-contained as distinguished from the exposed features of the structure illustrated in FIGS. 2 to 4. Moreover, the kinematics of operation of the enclosed embodiment differs somewhat in that the rotation of finger 39 is about an axis perpendicular to the longitudinal axis of shaft 34. There is no rigid connection between arm 47 and finger 39, the weight of finger 39 bringing it back to its lower position as seen in FIG. 6. Finger 39 may also be provided with spring urged means for returning it to the lower position.

The operation of this form of the invention also depends upon an abnormally deflated tire condition causing a bulge in the tire cross section. Aarm 47 is subjected to periodic swinging movements during the rotation of the tire in a deflated condition causing arm 47 to depress extension 41 of finger 39. The depression of extension 41 causes finger 39 to rotate upwardly until it strikes the upper wall of casing 35. Casing 35 is preferably fabricated of a resonant metallic material such as thin steel, aluminum or brass that rings clearly under the repeated hammering of ball 50.

It can be seen that the structure of FIGS. 5 to 10 afford certain advantages over that of FIGS. 1 to 4 in that the more delicate parts are enclosed and protected against flying stones, etc. The temptation to damage the slender finger 39 by bending is also eliminated. The sound emitting qualities of this embodiment can be brought up to the same level as the exposed baffle construction by the proper selection of materials.

The invention may be constructed of light weight materials to obviate unnecessary difficulty concerning wheel unbalance. Indeed, the weight of each unit in many cases may be no greater than the wheel weights normally required.

There has thus been shown and described a novel and improved tire deflation indicator adapted to provide a suitable warning whenever a tire becomes under-inflated. The device may be used on vehicles of all types including trucks, busses, station wagons and motorcycles, as well as automobiles.

Although the invention has been described in its preferred form with a certain degree of particularity, it is to be understood that the present disclosure has been made only by way of example, and that numerous changes in the details of construction and the combinations and arrangements adverted to, may be made without departing from the spirit and scope of the invention as hereinafter claimed.

What I claim is:

A device for transmitting audible warning signals pursuant to detecting under-inflation of a tire during rotation thereof and comprising a removable box-like housing bracket having an elongated cross-sectionally generally C-shaped clip rigidly secured thereto, said clip being adapted to be removably clamped onto the rim flange of a tire wheel, an elongated closed hollow sounding baffle secured to said bracket and communicating with the housing thereof and having its longitudinal axis substantially parallel to the rim flange of the wheel, a bearing formed in a wall of said housing and having its axis generally parallel to the periphery of said rim flange, a shaft journalled within said bearing and having one end projecting laterally outwardly from said housing in generally opposed relation to said sounding baffle and the other end terminating within said housing, an elongated crank-acting tire contacting arm secured to said one end of said shaft and having its free end engageable with the medial portion of the side wall of the tire, a laterally extending shank on said other end of said shaft within said housing, an elongated resilient clapper finger pivotally mounted intermediate its ends within said housing on an axis normal to the axis of said shaft and having its outer clapper-acting free end projecting loosely into said sounding baffle, the inner end of said finger being pivotally secured to said shank on an axis concentric therewith, a coil torsion spring received on one end of said shaft and urging the free end of said arm against said tire wall, said arm and said clapper element being cooperable to produce a periodic swinging-clapping action of said clapper element within said hollow surrounding baffle during rotation of the tire in an underinflated condition.

References Cited in the file of this patent

UNITED STATES PATENTS

| | | |
|---|---|---|
| 1,323,807 | Anderfuhren | Dec. 2, 1919 |
| 1,391,513 | Schroeder | Sept. 20, 1921 |
| 1,528,202 | Fuller | Mar. 3, 1925 |